United States Patent

Ferriss

[11] 3,900,843
[45] Aug. 19, 1975

[54] GYRO PICKOFF APPARATUS TO SENSE DEVIATIONS OF A VEHICLE AXIS FROM A GYRO SPIN AXIS

[75] Inventor: Lincoln S. Ferriss, Madison, N.J.

[73] Assignee: The Singer Company, Little Falls, N.J.

[22] Filed: Aug. 15, 1973

[21] Appl. No.: 388,602

Related U.S. Application Data

[62] Division of Ser. No. 286,024, Sept. 5, 1972, Pat. No. 3,808,542.

[52] U.S. Cl. ...... 340/347 AD; 250/231 GY; 328/30; 356/149
[51] Int. Cl. ........................................... H03k 13/20
[58] Field of Search ...................... 235/150.26, 196; 340/347 AD; 318/599; 328/30; 356/147, 149, 153, 154; 250/231 GY

[56] References Cited
UNITED STATES PATENTS

| | | | |
|---|---|---|---|
| 2,484,034 | 10/1949 | Isbister | 328/20 X |
| 2,991,659 | 7/1961 | Bowden | 250/231 GY UX |
| 3,323,378 | 6/1967 | Powell | 250/231 GY UX |
| 3,328,595 | 6/1967 | Todd | 250/231 GY |
| 3,573,633 | 4/1971 | Marrero | 328/30 |
| 3,789,393 | 1/1974 | Tripp | 318/599 X |

*Primary Examiner*—Malcolm A. Morrison
*Assistant Examiner*—Jerry Smith
*Attorney, Agent, or Firm*—T. W. Kennedy

[57] ABSTRACT

A gyro pickoff apparatus for sensing deviations of a vehicle axis from the gyro spin axis is shown. Pulse duration modulated signals representing X and Y deviations developed by a resolver from the outputs of a four quadrant detector mounted to sense deviation of the missile axis from the gyro spin axis are provided as inputs to phase locked loops which will output a constant number of pulses for each cycle of the inputs. Logic is provided to count the number of pulses occurring during the "on" time of the input thereby providing a ratio of "on" time to total pulse time which is independent of pulse repetition rate. The count is stored to provide a digital output and may then be converted in a digital to analog converter to provide signals which can control the missile vanes to make course corrections.

6 Claims, 6 Drawing Figures 3,900,843

GYRO PICKOFF APPARATUS TO SENSE DEVIATIONS OF A VEHICLE AXIS FROM A GYRO SPIN AXIS

This is a division of application Ser. No. 286,024, filed Sept. 5, 1972, and now U.S. Pat. No. 3,808,542.

BACKGROUND OF THE INVENTION

This invention relates to apparatus for converting a pulse duration modulated signal to a digital and/or analog signal and more particularly for such apparatus useful in attitude control systems. Gyros are used in missile control systems to direct the missile along a predetermined path and make corrections as necessary. For example, in a ground to ground short range missile the gyro might initially be set up with its spin axis pointed in the direction in which the missile was desired to run. If the missile deviates from the desired course, this will be sensed and the sensed signals used to control control vanes on the missile to direct it back to the proper course. With short range missiles in particular, it is necessary that these control signals be fast acting so that the missile can get back on course before it reaches its target and does not follow an oscillatory path. Sensors used in the prior art have used averaging and filtering techniques which do not give the required fast response needed in a missile of this sort.

More specifically, the averaging has generally been accomplished by direct filtering of a pulse duration modulated signal developed by a sensor associated with the gyro. This produces a time lag such that the averaged value can not be known until, at least, a full cycle of the signal occurs. Actual practical filters which have been used previously require a plurality of cycles before a meaningful average is produced. This slow response is required to avoid having a signal with a large ripple which could cause undesirable effects. Thus, it is not possible to obtain, with these prior art techniques, a signal which is both stable and which has a fast response. An additional problem in a short range missile is that the gyro may be brought up to speed before the missile is fired and then allowed to slowly run down as the missile goes toward the target. This means that the system which is sensing deviations from desired course must also be capable of operating over a range of gyros speeds.

SUMMARY OF THE INVENTION

The apparatus of the present invention utilizes a silicon optical detector on which is focused a light beam directed from the spinning gyro. The detector is fixed with respect to the missile so that, as the missile deviates, the light from the gyro will trace a circular or elliptical path which will go from being a centered on the detector to an offset position. The detector, divided in the four quadrants, will then provide output signals indicating the portion of time that each quadrant is in light path. These signals are then resolved into two pulse duration modulated signals indicating respectively X and Y deviation. Each pulse duration modulated signal is then converted, through a phase locked-loop to a digital signal which may then be converted into an analog signal if desired. The use of the phase locked-loop insures that a constant output ratio will be provided over a full range of gyro speed. Because the data is digitized, the deviation is available to provide control corrections as soon as it is available rather than after the time delay as experienced in prior art systems using averaging and filtering techniques.

DETAILED DESCRIPTION OF THE PREFERRED EMBODIMENT

Figure 1:
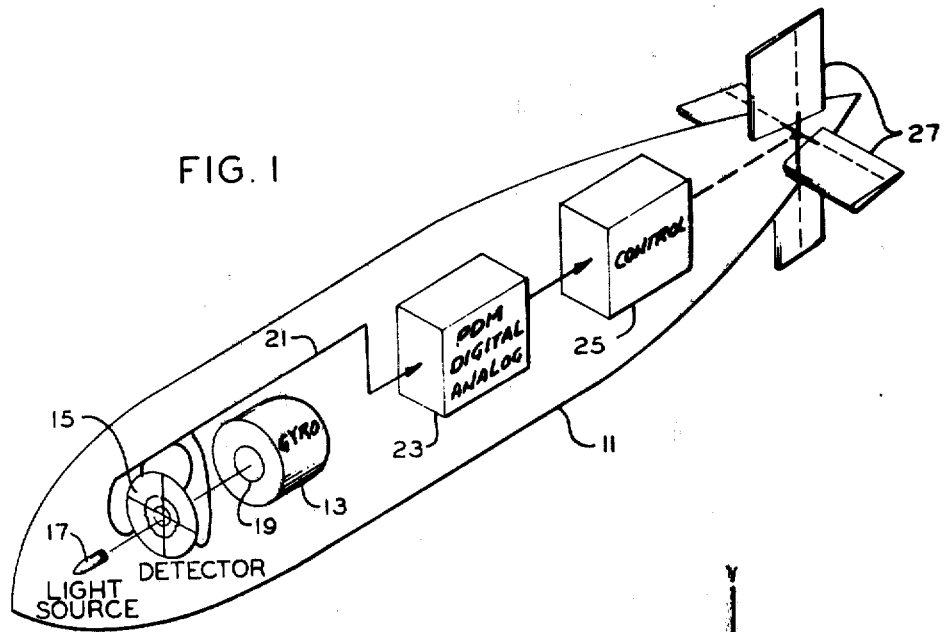
FIG. 1 is a perspective view of a typical missile in which the apparatus of the present invention may be used.

FIG. 1 shows a typical missile control system in which the apparatus of the present invention may be used. The missile contains within it a gyro 13 which may be spun up to speed before the missile is launched. In front of the gyro 13 there is shown a four quadrant silicon optical detector 15 containing a hole in its center. A light emitting diode 17 projects light through this hole to a mirror 19 mounted on the gyro 13. Mirror 19 is adjusted to reflect light from light emitting diode 17 so that when the gyro is aligned with the detector it will trace a circle centered on the detector face. Output signals from the detector are provided on line 21 to the pulse duration modulation to analog converter 23 of the present invention which will be described in detail below. The analog signals obtained from the converter 23 are then provided to a block 25 which contains controls to actuate the vanes 27 of the missile.

Figure 3:
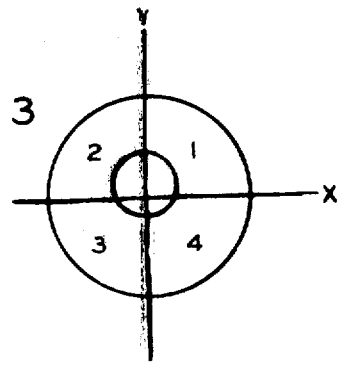
FIG. 3 is a plan view of the same pattern showing how the circle is offset in the Y direction.
Figure 2:
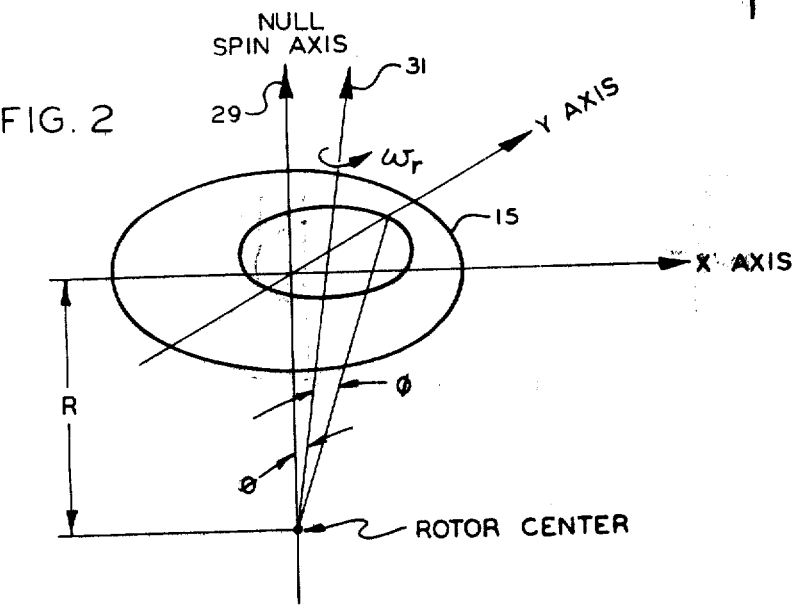
FIG. 2 is a perspective view showing the geometry of the pattern of the light beam traced on the four quadrant detector of the present invention.

If the missile deviates from the initial path, the gyro will remain fixed with respect to the earth but the detector will move with the missile and thus with respect to gyro. The resulting geometry is shown on FIG. 2. The arrow 29 is the null spin axis of the gyro and corresponds to the axis of missile 11. Axis 31 represents the actual spin axis of the gyro now that the missile has been displaced. The angle between the two is shown on the drawing as Theta. The angle Phi is the angle between the spin axis and the light beam tracing the pattern on the detector 15. As is evident from the drawing the light beam is now tracing an elliptical path and is spending more time in some quadrants of the detector than at others. This is shown in more detail in FIG. 3. The circle or ellipse is displaced, in this example, on only one axis, i.e., the Y axis. This means that the time the light spends in the quadrants labeled 1 and 2 will be much greater than the time spent in quadrants 3 and 4.

This particular arrangement of detector 15, light emitting diode 17 and mirror 19 is not critical to proper operation. Other arrangements which cause the light to spend more time in some quadrants than is spent in others when deviations occur will work equally well. For example, the detector 15 could have a curved surface to cause the light to always trace a circle.

Figure 4:
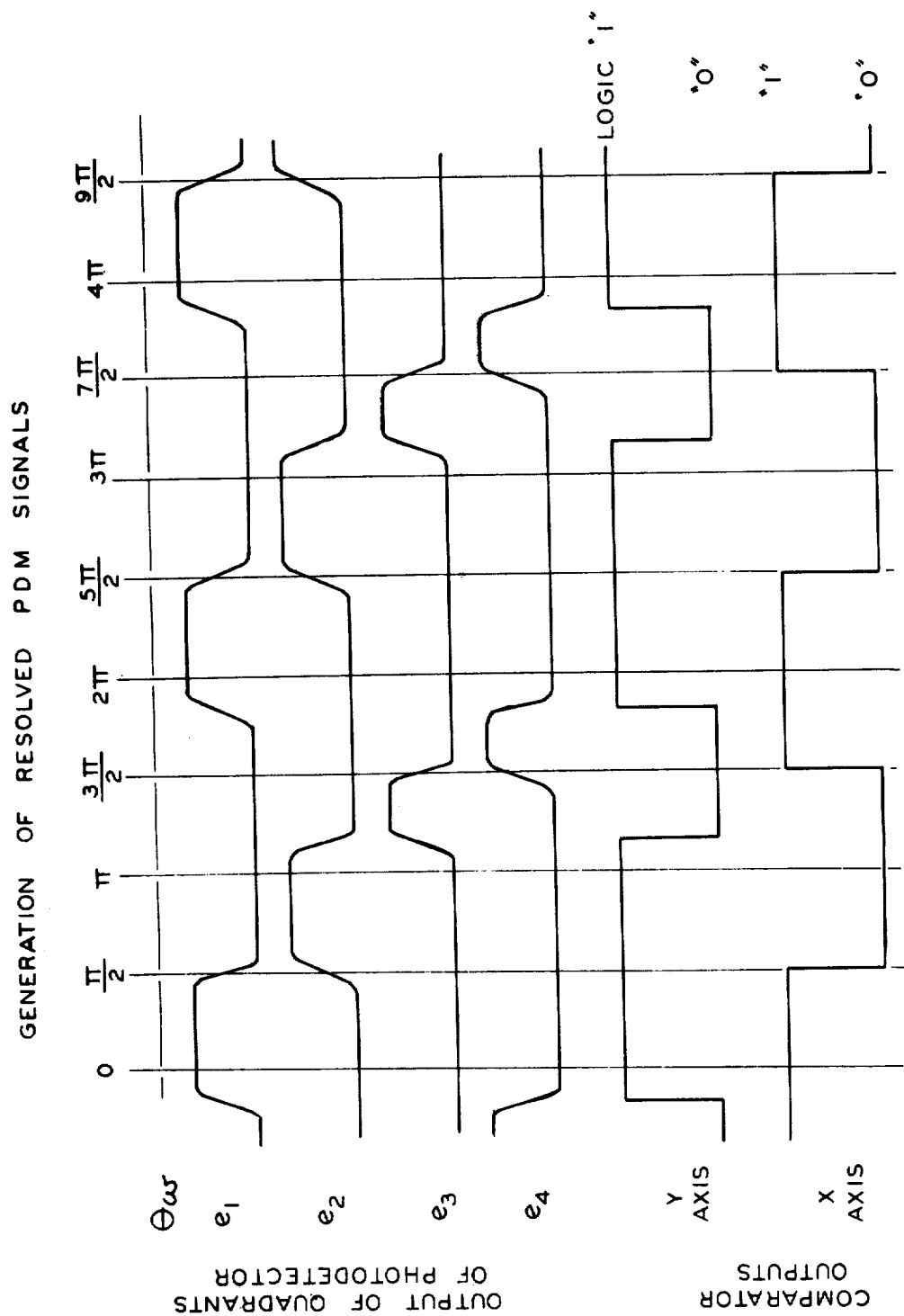
FIG. 4 is a waveform diagram illustrating the outputs of the four quadrant detector and the outputs of the comparator of the present invention.

The resulting outputs from these four quadrants are shown on FIG. 4. The $e_1$ trace represents the output from quadrant 1, $e_2$, the output from quadrant 2, $e_3$, the output from quadrant 3 and and $e_4$ the output from quadrant 4. The index of modulation of the light on the quadrants can be expressed by the equation:

$$M_{x,y} = \frac{2}{\pi} \sin^{-1} \frac{(R \text{ TAN } \theta_{x,y})}{r}$$

where $r = R \text{ TAN } \phi$.

The indicies of modulation may also be described in terms of the dwell times of the light shaft on each quadrant. The equations then become:

$$M_x = \frac{(t1 + t4) - (t2 + t3)}{t1 + t2 + t3 + t4}$$

$$M_y = \frac{(t1 + t2) - (t3 + t4)}{t1 + t2 + t3 + t4}$$

These equations will then in effect indicate the displacement along the X and Y axes respectively.

In the circuit below the pulse duration waveform is constructed by operating on the quadrant outputs which have pulse widths proportional to dwells times, in effect implementing these equations.

Figure 5:
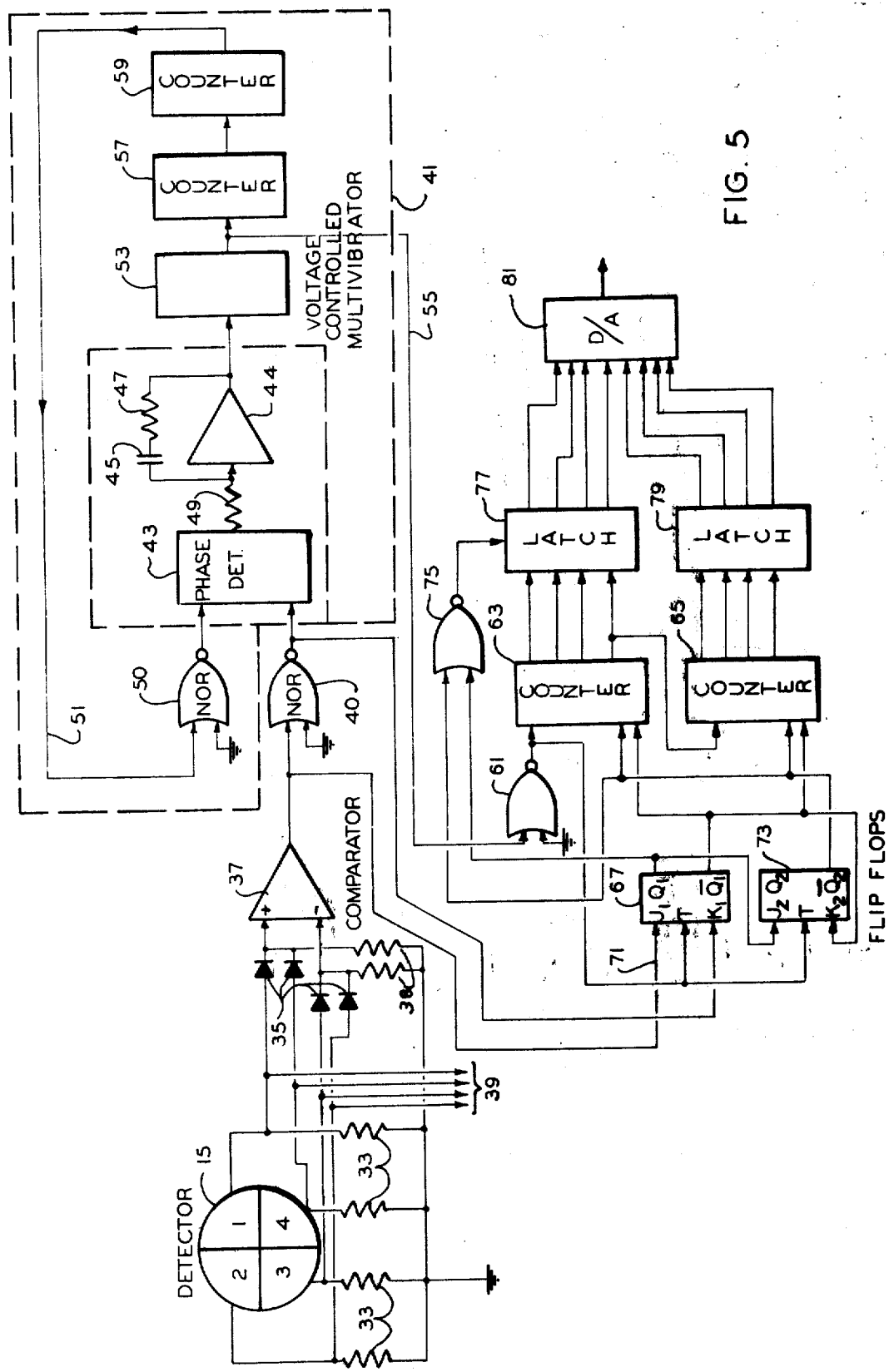
FIG. 5 is a schematic-diagram of the circuit of the present invention.

The apparatus for solving these equations is shown on FIG. 5. The output of detector 15 for each of the quadrants 1, 2, 3 and 4 is taken from across a resistor 33 to ground through a diode 35 to the input of a comparator 37. The circuitry shown is for the X axis. Lines 39 are shown going to the Y axis circuitry which would be a duplicate of that shown. In the case of the X axis, the outputs of quadrants 1 and 4 are provided to the positive input of the comparator and the outputs of quadrants 2 and 3 are provided to the negative inputs. Examination of the equations above will show that this is consistent, i.e., this portion of the circuit solves for the numerators of the equations. Each of the inputs is also connected to a minus voltage through a high value resistor 38 to provide a greater voltage difference between the two inputs and thereby provided faster operation. The results at the output of comparator 37 can best be seen by referring to FIG. 4 which shows the X and Y axis outputs. The outputs shown are for the example of FIG. 3. It can be seen that the X axis which is not displaced in the example has equal "on" and "off" times. ("on" is a logic "1" and "off" a logic "0.") The Y axis on the other hand has a much greater "on" time than "off" time.

The output of comparator 37 is provided as an input through a Nor gate 40 (used as an inverter) to a phase locked loop 41. The main purpose of phase locked loop 41 is to provide an output which is a number of pulses proportional to the "on" time of the input from comparator 37. Since the system must operate over various gyro speeds it is desirable the number of pulses be related to the percentage of "on" time rather than the actual "on" time. This is evidenced by the denominator of the above equations which is implicity computed by the phase locked loop 41. The first element encountered in the phase locked loop 41 is a phase detector 43. Phase detector 43 has included in its output an operational amplifier 44. (The phase detector and amplifier are available in a single module listed in the table below.) Capacitor 45 and resistor 47 are in the feedback path of amplifier 44. Resistor 49 provides the input of this amplifier from the phase detector 43. The phase detector compares the phase of the input from comparator 37 with a second input inverted through a second Nor gate 50 from feedback loop on line 51 to be described below. The voltage output of phase comparator 43 will be proportional to difference in phase between the two inputs. The amplifier at the output of phase detector 43 is in the circuit to provide filtering. The filtered output is provided to a voltage controlled multivibrator which will output pulses at a frequency related to the input voltage. The multivibrator output is the circuit output on line 55. The output of the multivibrator 53 is also provided to a first four stage counter 57 which is connected to a second four stage counter 59 together providing for a division by $2^8$. ($2^8$ is used here as an example. Other powers of two may be used depending on the required resolution. Thus, in general, counters 57 and 59 comprise a divide by $2^n$ counter).

The output frequency of the last stage in four bit counter 59 will be a pulse train whose frequency is the frequncy of multivibrator 53 divided by $2^8$. This output is the feedback input on line 51 to the phase comparator. The closed loop will cause the multivibrator to adjust its frequency to that where the two signal inputs to the phase detector 43 are in phase causing the frequency output of multivibrator 53 to be $2^8$ times the input frequency. Thus, for each full cycle of the X or Y comparator outputs as shown on FIG. 4, the voltage controlled multivibrator will output $2^8$ or 256 pulses no matter how long the period of that cycle is. For design details of the phase locked loop see Motorola Application Note 535 entitled, "Phase Locked Loop Design Fundamentals."

Figure 6:
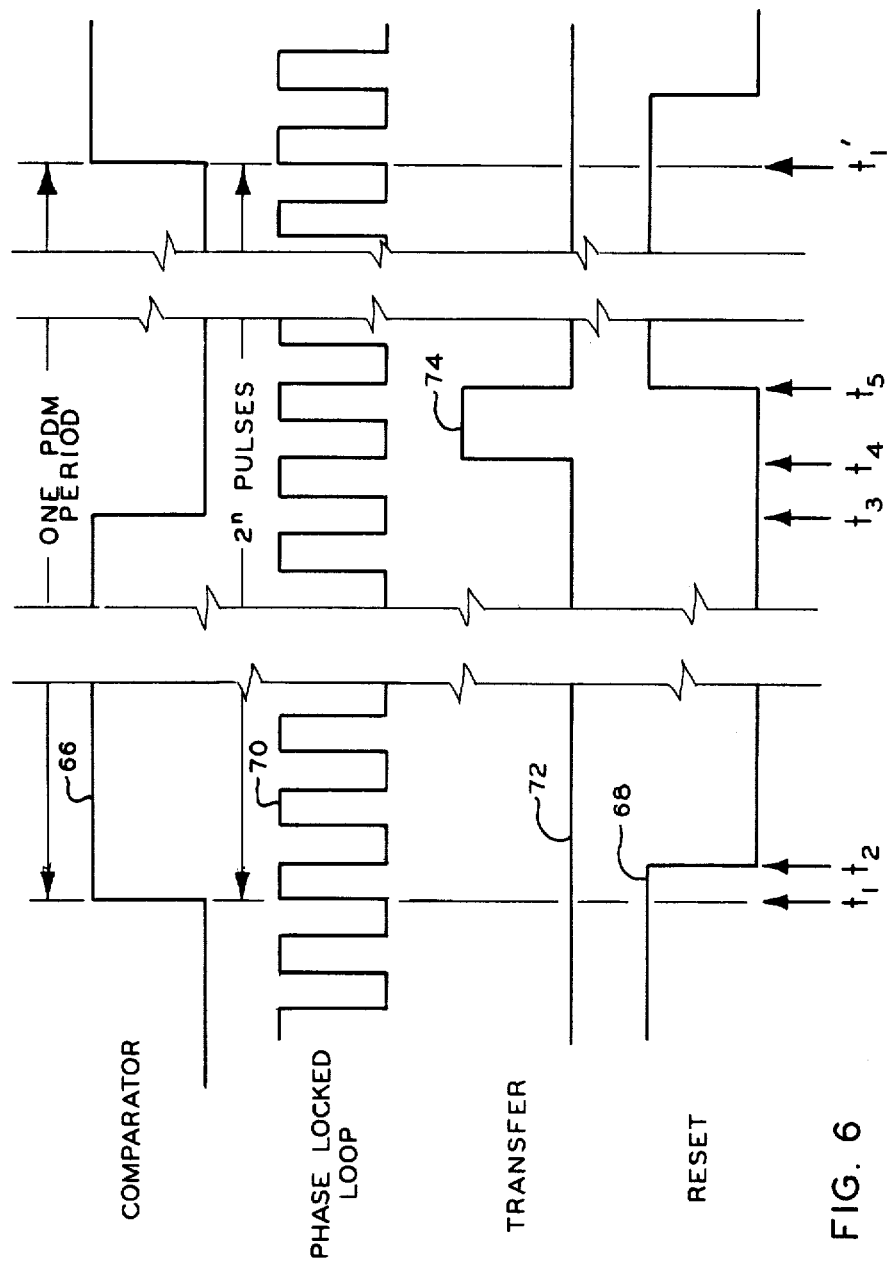
FIG. 6 is a waveform diagram showing the relationship between the comparator outputs, the outputs of the voltage controlled multivibrator and the logic control signals of the schematic of FIG. 6.

The output of multivibrator 53 on line 55 is provided through inverting Nor gate 61 to an eight bit counter comprising four bit counter 63 and four bit counter 65. Operation of this portion of the circuit can best be understood by referring to the waveforms of FIG. 6. Prior to the comparator pulse 66 of FIG. 6 going high, both flip flop 67 and flip flop 73 will be in the reset condition. The $\overline{Q1}$ output from flip flop 67 and the $\overline{Q2}$ output from flip flop 73 will be providing a reset to counters 63 and 65 holding them in the zero state. This is shown by waveform 68. When the pulse 66 goes high the J1 input to flip flop 67 is enabled. The first pulse of pulse train 70 occurring thereafter, after being inverted by Nor gate 61, is the trigger input to flip flop 67 and will set flip flop 67 on its trailing edge removing the the $\overline{Q1}$ output to remove the reset from counters 63 and 65 allowing them to count the pulses from multivibrator 53. The Q1 output of flip flop 67 which will now be present will enable the J2 input of flip flop 73 which will then be set on the next pulse of waveform 70 which is provided to its trigger input by gate 61.

At gate 75, a Nor gate, a pulse output will occur when both $\overline{Q1}$ and Q2 are present. Thus, with both $\overline{Q1}$ and $\overline{Q2}$, no pulse was present as shown by waveform 72. Likewise during the condition when Q1 and $\overline{Q2}$ were present and now when Q1 and Q2 are present the voltage stays low. But now gate 75 has one of its required inputs, i.e., Q2 and is thus enabled to provide an output when flip flop 67 is reset providing a $\overline{Q1}$ output.

When comparator pulse 66 goes to zero the K input of flip flop 67 is enabled and, on the next pulse 70, it will be reset. Gate 75 now has both inputs and will provide a transfer pulse 74 to enable eight latches contained in latch modules 77 and 79. The value formerly in the counter 63 and 65 will be now transferred to these latches and stored there until the next transfer pulse is provided from gate 75. The transfer pulse will be of short duration since on the next pulse 70 flip flop 73 will be reset, its K input having been enabled by the $\overline{Q1}$ output of flip flop 67. Examination of FIG. 6 will show that a pulse was missed at the beginning of the comparator output but that pulse has been picked up at the end of the output because of the delay in the transfer pulse caused by waiting for the falling edge of the pulse out of gate 61. In this way the proper number of pulses are counted. The number of pulses stored in latches 77 and 79 will indicate the number of pulses occurring during the "on" time of pulse 66 giving the required ratio.

The output of latches 77 and 79 are provided as inputs to a digital to analog converter 81 which converts these to an analog signal. The signal to analog converter is scaled such that with all zeros as inputs it will have an output of, for example −10 volts, with a count of 128 into it, it will have a zero volts output and with a count of 256, or all bits ones, it will have an output of +10 volts. This means that if the output signal of the comparator is "on" half the time and "off" half the time, a condition indicating that the missile is properly aligned, a count of 128 or half the total count of 256 should result and thus the output will be zero. If the "on" period of the comparator is shorter or longer, the count will be smaller or larger, and the corresponding output of the digital to analog converter will be positive or negative depending on the direction of the error.

It should be noted that, even if the missile deviates to cause the light to go completely off the detector 15, proper control signals will be maintained. In that case the latches 77 and 79 will continue to store the last output (which would be at a maximum in one direction of the other) until the flight path is corrected to bring the light back to the detector. In prior art systems using filtering, the filter input from the detector would go to zero resulting in a zero output indicating the missile was on course and the target would not be reached.

Examples of the hardware elements which may be used in the circuit of the present invention are as follows:

TABLE

| Hardware Element | Available From | Part No. |
| --- | --- | --- |
| Four Quadrant Silicon Optical Detector | United Detector Technology | — |
| Voltage Comparator | National Semiconductor | LM 311D |
| Phase Detector | Motorola | MC 4044 |
| Voltage Controlled MV | Motorola | MC 4024 |
| Counters | Texas Instruments | 7493 |
| Latches | Texas Instruments | 7475 |
| Flip Flops | Texas Instruments | 7473 |
| Gates | Texas Instruments | 7402 |
| Digital Analog Converter | Micro Networks Corp. | MN 316 |

Thus, apparatus which is useful in converting a pulse duration modulated signal from a gyro pickoff to a digital and or analog signal which is both fast and accurate and compensates for variations in gyro speed has been shown. Although a specific embodiment of the invention has been shown and described, it will be obvious to those skilled in the art that various modifications may be made without departing from the spirit of the invention, which is intended to be limited solely by the appended claims.

What is claimed is:

1. Gyro pickoff apparatus to sense deviations of a vehicle axis from the gyro spin axis comprising:
    a. a silicon optical detector divided into four quadrants by mutually perpendicular X and Y planes having their intersection coincident with the vehicle axis fixed to the vehicle and providing a separate output for each quadrant;
    b. a light source and a mirror mounted on the gyro and arranged to reflect light from said source onto said detector such as to trace a circle centered at the center of said detector when said detector and gyro are aligned to activate said detector sequentially as said gyro rotates and adapted to activate each quadrant for equal periods of time when said gyro and detector are aligned whereby misalignment will cause said circle to shift thereby causing said detector to output signals of unequal duration from said four quadrants;
    c. resolving means to convert said four quadrant outputs into two pulse duration modulated signals proportional respectively to an X and Y deviation of the vehicle;
    d. first and second pulse duration modulation to digital conversion means to convert the said X and Y signals to digital outputs each of said digital outputs being proportional to the ratio of the "on" time to the total pulse cycle time of its respective pulse duration modulated input.

2. The invention according to claim 1 wherein said resolving means comprises:
    a. a first voltage comparator to provide said X deviation said comparator having as inputs to its positive input terminal the two detector outputs from the quadrants on one side of the Y plane and to its negative input the outputs from the two quadrants on the other side of the Y plane and providing its output to said first pulse duration modulation to digital conversion means; and
    b. a second voltage comparator to provide said Y deviation, said comparator having as inputs to its positive input terminal the two detector outputs from the quadrants on one side of the X plane and to its negative inputs the two detector outputs from the quadrants on the other side of the X plane and providing its output to said second pulse duration modulation to digital conversion means.

3. The invention according to claim 2 wherein each of said first and second pulse duration modulation to digital conversion means comprise:
    a. a phase locked loop including a pulse generator and a divide $2^n$ counter said phase locked loop having said pulse duration modulated signal as an input and providing an output of $2^n$ pulses for each pulse cycle;
    b. a $2^n$ binary counter having the output of said phase locked-loop as an input;
    c. a $2^n$ binary storage means;
    d). means to reset said counter at the beginning of the "on" time of each pulse duration modulated pulse; and
    e. means to transfer the count in said counter to said storage means at the end of the "on" time of each pulse duration modulated pulse.

4. The invention according to claim 3 wherein said phase locked loop comprises:
   a. a phase detector having said pulse duration modulated signal as a first input and a feedback signal as a second input;
   b. means to filter the output of said phase detector;
   c. a voltage controlled multivibrator having said filtered output as an input and providing a square wave output at a frequency proportional to the input said multivibrator output being the output of said phase locked-loop; and
   d. a divide by $2^n$ binary counter having said multivibrator output as an input and providing an output pulse train as said feedback signal.

5. Gyro pickoff apparatus to sense deviations of a vehicle axis from the gyro spin axis comprising:
   a. a four quadrant detector fixed to the vehicle and providing a separate output for each quadrant;
   b. means fixed with respect to and cooperative with the gyro to activate said detector sequentially as said gyro rotates and adapted to activate each quadrant for equal periods of time when said gyro and detector are aligned and for unequal times when not aligned;
   c. resolving means to convert said four quadrant outputs into two pulse duration modulated signals proportional respectively to an X and Y deviation of the vehicle;
   d. first and second pulse duration modulation to digital conversion means to convert the said X and Y signals to digital outputs each of said digital outputs being proportional to the ratio of the "on" time to the total pulse cycle time of its respective pulse duration modulated input;
   e. a phase locked loop including a pulse generator and a divide by $2^n$ counter, said phase locked loop having said pulse duration modulated signal as an input and providing an output of $2^n$ pulses for each pulse cycle;
   f. a $2^n$ binary counter having the output of said phase locked loop as an input;
   g. a $2^n$ binary storage means;
   h. means to reset said counter at the beginning of the "on" time of each pulse duration modulated pulse; and
   i. means to transfer the count in said counter to said storage means at the end of the "on" time of each pulse duration modulated pulse.

6. The invention according to claim 5 and further including first and second digital to analog converter means to convert said digital outputs to analog outputs.

* * * * *